United States Patent
Morita et al.

(10) Patent No.: US 9,344,915 B2
(45) Date of Patent: May 17, 2016

(54) MOBILE COMMUNICATION METHOD (71) Applicant: KYOCERA CORPORATION, Kyoto (JP)

(72) Inventors: Kugo Morita, Yokohama (JP); Noriyoshi Fukuta, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 73 days.

(21) Appl. No.: 14/355,680

(22) PCT Filed: Nov. 2, 2012

(86) PCT No.: PCT/JP2012/078520
§ 371 (c)(1),
(2) Date: May 1, 2014

(87) PCT Pub. No.: WO2013/065839
PCT Pub. Date: May 10, 2013

(65) Prior Publication Data
US 2014/0293965 A1 Oct. 2, 2014

Related U.S. Application Data (60) Provisional application No. 61/555,186, filed on Nov. 3, 2011.

(51) Int. Cl.
*H04W 28/04* (2009.01)
*H04W 74/08* (2009.01)
*H04W 72/08* (2009.01)
*H04W 72/12* (2009.01)

(52) U.S. Cl.
CPC .......... *H04W 28/048* (2013.01); *H04W 72/082* (2013.01); *H04W 74/0833* (2013.01); *H04W 72/1231* (2013.01)

(58) Field of Classification Search
CPC .......... H04W 72/1231; H04W 72/082; H04W 74/0833; H04W 28/048; H04W 68/00; H04W 84/045; H04W 52/245; H04W 72/0426; H04W 52/60; H04W 52/244; H04W 52/343; H04W 28/26; Y02B 60/50
See application file for complete search history.

(56) References Cited

U.S. PATENT DOCUMENTS

| | | | | |
|---|---|---|---|---|
| 2009/0264077 | A1* | 10/2009 | Damnjanovic | H04W 52/244 455/63.1 |
| 2010/0190447 | A1* | 7/2010 | Agrawal | H04W 72/082 455/63.1 |
| 2010/0234040 | A1* | 9/2010 | Palanki | H04L 5/0073 455/452.2 |

(Continued)

OTHER PUBLICATIONS

International Search Report; PCT/JP2012/078520; Feb. 5, 2013.
(Continued)

*Primary Examiner* — Jung-Jen Liu
(74) *Attorney, Agent, or Firm* — Studebaker & Brackett PC (57) ABSTRACT

A mobile communication method is applied to a mobile communication system including a general base station that manages a general cell and a specific base station that manages a specific cell having a coverage area smaller than a coverage area of the general cell. The mobile communication method comprises: a step A of transmitting, from a general mobile terminal to the specific base station, an RACH signal for interference detection, the general mobile terminal being a mobile terminal in a connected state in the general cell; and a step B of notifying, by the specific base station, the general base station of a detection result of the RACH signal for interference detection.

10 Claims, 9 Drawing Sheets

(56) References Cited

U.S. PATENT DOCUMENTS

| | | | | |
|---|---|---|---|---|
| 2011/0105135 | A1* | 5/2011 | Krishnamurthy | H04W 16/10 455/450 |
| 2011/0182252 | A1* | 7/2011 | Liu | H04W 74/008 370/329 |
| 2011/0222416 | A1* | 9/2011 | Damnjanovic | H04W 72/12 370/252 |
| 2012/0021753 | A1* | 1/2012 | Damnjanovic | H04W 72/1289 455/450 |
| 2012/0083280 | A1* | 4/2012 | Liu | H04W 16/14 455/446 |
| 2012/0157082 | A1* | 6/2012 | Pedersen | H04W 24/10 455/422.1 |
| 2012/0184206 | A1* | 7/2012 | Kim | H04L 5/0091 455/9 |
| 2012/0307780 | A1* | 12/2012 | Mochizuki | H04L 1/1812 370/329 |
| 2013/0148620 | A1* | 6/2013 | Nanri | H04W 74/006 370/329 |
| 2014/0226605 | A1* | 8/2014 | Xu | H04W 48/20 370/329 |

OTHER PUBLICATIONS

Kyocera Corp, Carrier-based HetNet ICIC, 3GPP TSG-RAN WG3 #73bis R3-112611, Oct. 10, 2011.

3GPP TS 36.300 V9.4.0 (Jun. 2010); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9).

Nokia Siemens Networks, Nokia Corporation, RRC Impact of eICIC, 3GPP TSG-RAN WG2 Meeting #71bis R2-105467, Oct. 11, 2010.

The extended European search report issued by the European Patent Office on Feb. 3, 2015, which corresponds to European Patent Application No. 12845202.6-1857 and is related to U.S. Appl. No. 14/355,680.

Communication pursuant to Rules 70(2) and 70a(2) EPC issued by the European Patent Office on Feb. 20, 2015, which corresponds to European Patent Application No. 12845202.6-1857 and is related to U.S. Appl. No. 14/355,680.

* cited by examiner

MOBILE COMMUNICATION METHOD

TECHNICAL FIELD

The present invention relates to a mobile communication method applied to a mobile communication system in which a general cell and a specific cell are coexisting.

BACKGROUND ART

In recent years, there has been proposed a next generation mobile communication system such as LTE (Long Term Evolution).

In the mobile communication system, it is assumed that a plurality of types of cells (for example, a general cell and a specific cell) having different coverage areas are coexisting. The coverage area of the general cell is larger than the coverage area of the specific cell. The general cell, for example, is a micro cell provided by a communication provider. The specific cell, for example, is a femto cell or a home cell provided by a third party other than the communication provider. The specific cell may be a CSG (Closed Subscriber Group) cell or a pico cell provided by the communication provider.

Here, the coverage area of the specific cell is considered to exist in the coverage area of the general cell. In such a case, an uplink signal transmitted from a mobile terminal (hereinafter, a general mobile terminal) that is in an idle state or a connected state in the general cell is considered to give interference to the specific cell.

However, the general cell is not able to identify the general mobile terminal that gives interference to the specific cell. Therefore, even when a signal (for example, OI: Overload Indicator) indicating the occurrence of interference is transmitted from the specific cell to the general cell, the general cell is not able to resolve the interference that the specific cell receives.

CITATION LIST

Non-Patent Literature

Non-Patent Literature 1: 3GPP TS 36. 300 V9. 4. 0

SUMMARY OF INVENTION

A mobile communication method according to a first feature is applied to a mobile communication system including a general base station that manages a general cell and a specific base station that manages a specific cell having a coverage area smaller than a coverage area of the general cell. The mobile communication method comprises: a step A of transmitting, from a general mobile terminal to the specific base station, an RACH signal for interference detection, the general mobile terminal being a mobile terminal in a connected state in the general cell; and a step B of notifying, by the specific base station, the general base station of a detection result of the RACH signal for interference detection.

In the first feature, the mobile communication method comprises a step C of transmitting, from the general base station to the general mobile terminal, an RACH parameter used in transmission of the RACH signal for interference detection and a transmission timing of the RACH signal for interference detection. The transmission timing of the RACH signal for interference detection is determined based on a timing shift amount between the general cell and the specific cell.

In the first feature, the mobile communication method comprises: a step D of notifying, by the specific base station, the general base station of an RACH parameter candidate for selecting the RACH parameter.

In the first feature, in the step D, when interference occurs in the specific cell, the RACH parameter candidates are notified by the specific base station to the general base station.

In the first feature, the mobile communication method comprises: a step E of restricting, by the general base station, scheduling of an uplink radio resource without assigning the uplink radio resource in the specific cell within an RACH transmission period in which the RACH signal for interference detection is transmitted.

In the first feature, a distance between an edge closest to the general base station among edges of a coverage area of the specific cell and the general base station is a distance $L_{MIN}$. A distance between an edge most distant from the general base station among the edges of the coverage area of the specific cell and the general base station is a distance $L_{MAX}$. In the step C, the RACH parameter and the transmission timing of the RACH signal for interference detection are transmitted from the general base station to the general mobile terminal located in a belt-like annular area indicating a range from the distance $L_{MIN}$ to the distance $L_{MAX}$.

In the first feature, the belt-like annular area is determined based on a difference between a synchronization timing of a downlink signal of the mobile terminal that is handed over from the general cell to the specific cell and a synchronization timing of an uplink signal of the mobile terminal that is handed over from the general cell to the specific cell.

In the first feature, the belt-like annular area is determined based on a synchronization timing correction value of the uplink signal of the mobile terminal that is handed over from the specific cell to the general cell.

DESCRIPTION OF THE EMBODIMENT

Hereinafter, a mobile communication system according to an embodiment of the present invention will be described with reference to the accompanying drawings. Note that in the descriptions of the drawings below, identical or similar signs are assigned to identical or similar portions.

However, it must be noted that the drawings are schematically shown and the ratio of each dimension and the like are different from the real ones. Accordingly, specific dimensions and the like should be determined by taking into consideration of the explanation below. Of course, among the drawings, there are portions that the dimensional relationships or the ratios are different from each other.

Summary of Embodiments

A mobile communication method is applied to a mobile communication system including a general base station that manages a general cell and a specific base station that manages a specific cell having a coverage area smaller than a coverage area of the general cell. The mobile communication method comprises: a step A of transmitting, from a general mobile terminal to the specific base station, an RACH signal for interference detection, the general mobile terminal being a mobile terminal in a connected state in the general cell; and a step B of notifying, by the specific base station, the general base station of a detection result of the RACH signal for interference detection.

In the embodiment, the RACH signal for interference detection is transmitted from the general mobile terminal to the specific base station and the detection result of the RACH signal for interference detection is notified by the specific base station to the general base station. Consequently, the general base station can identify an interference source (the general mobile terminal) of interference, which is given to the specific cell, according to the detection result of the RACH signal for interference detection.

First Embodiment (Mobile Communication Station)

Figure 1:
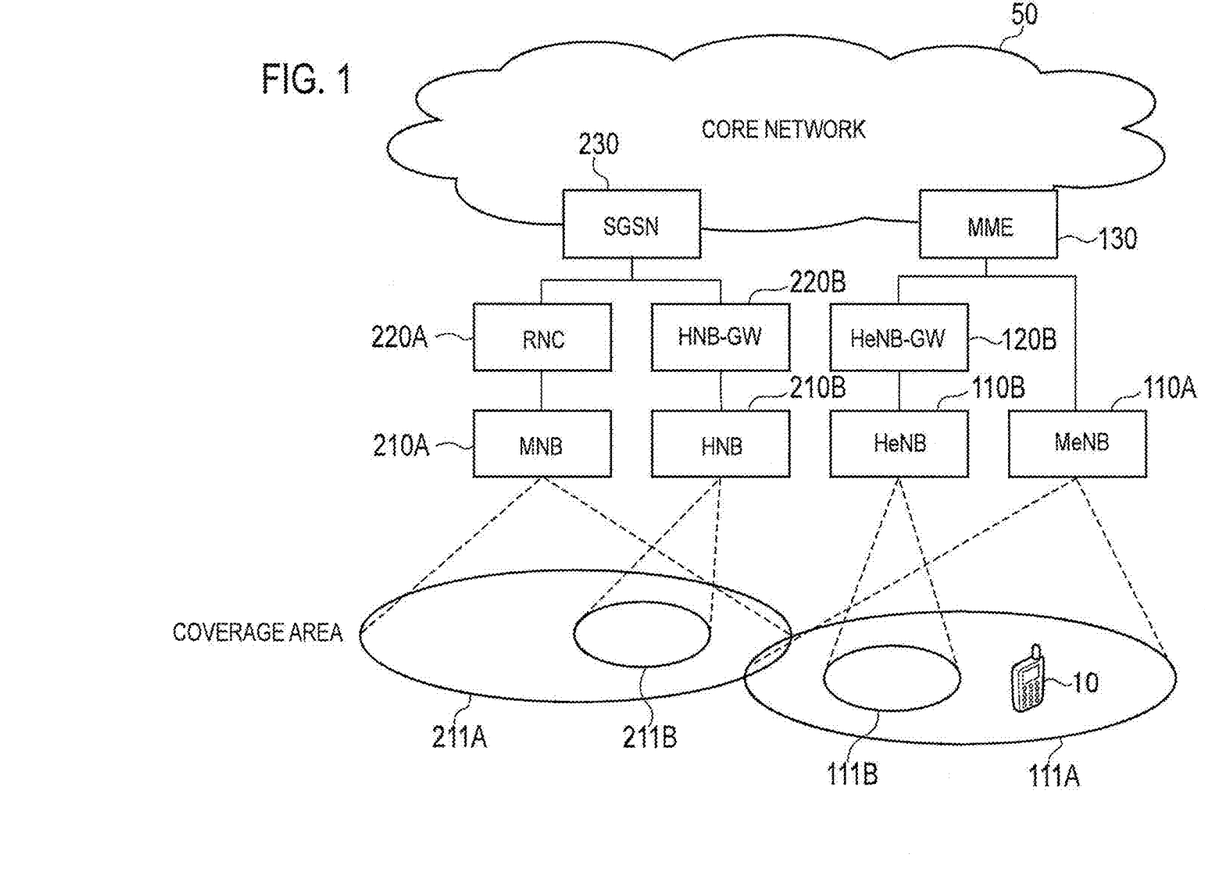
FIG. 1 is a diagram of a mobile communication system 100 according to a first embodiment.

Hereinafter, a mobile communication system according to a first embodiment will be described. FIG. 1 is a diagram of a mobile communication system 100 according to the first embodiment.

As shown in FIG. 1, the mobile communication system 100 comprises a radio terminal 10 (hereinafter, UE 10) and a core network 50. Further, the mobile communication system 100 comprises a first communication system and a second communication system.

The first communication system is, for example, a communication system corresponding to LTE (Long Term Evolution). The first communication system comprises, for example, a base station 110A (hereinafter, MeNB 110A), a home base station 110B (hereinafter, HeNB 110B), a home base station gateway 120B (hereinafter, HeNB-GW120B), and a MME 130.

Further, a radio access network (E-UTRAN; Evolved Universal Terrestrial Radio Access Network) corresponding to the first communication system is configured from the MeNB 110A, the HeNB 110B, and the HeNB-GW 120B.

The second communication system is, for example, a communication system corresponding to UMTS (Universal Mobile Telecommunication System). The second communication system comprises a base station 210A (hereinafter, MNB 210A), a home base station 210B (hereinafter, HNB 210B), a RNC (Radio Network Controller) 220A, a home base gateway 220B (hereinafter, HNB-GW 220B), and a SGSN 230.

Further, a radio access network (UTRAN; Universal Terrestrial Radio Access Network) corresponding to the second communication system is configured from the MNB 210A, HNB 210B, RNC 220A, and HNB-GW 220B.

The UE 10 is an apparatus (User Equipment) configured to perform communication with the second communication system or the first communication system. For example, the UE 10 has a function of performing radio communication with the MeNB 110A and HeNB 110B. Alternatively, the UE 10 has a function of performing radio communication with the MNB 210A and the HNB 210B.

The MeNB 110A manages a general cell 111A and is an apparatus (evolved NodeB) configured to perform radio communication with the UE 10 being present in the general cell 111A.

The HeNB 110B manages a specific cell 111B and is an apparatus (Home evolved NodeB) configured to perform radio communication with the UE 10 being present in the specific cell 111B.

The HeNB-GW 120B is connected to the HeNB 110B and is an apparatus (Home evolved NodeB Gateway) configured to manage the HeNB 110B.

The MME 130 is connected to the MeNB 110A and is an apparatus (Mobility Management Entity) configured to manage the mobility of the UE 10 having set up a radio connection with the MeNB 110A. Further, the MME 130 is connected to the HeNB 110B through the HeNB-GW 120B and is an apparatus configured to manage the mobility of the UE 10 having set up a radio connection with the HeNB 110B.

The MNB 210A manages a general cell 211A and is an apparatus (NodeB) configured to perform radio communication with the UE 10 being present in the general cell 211A.

The HNB 210B manages a specific cell 211B and is an apparatus (Home NodeB) configured to perform radio communication with the UE 10 being present in the specific cell 211B.

The RNC 220A is connected to the MNB 210A and is an apparatus (Radio Network Controller) configured to set up a radio connection (RRC Connection) with the UE 10 being present in the general cell 211A.

The HNB-GW 220B is connected to the HNB 210B and is an apparatus (Home NodeB Gateway) configured to set up a radio connection (RRC Connection) with the UE 10 being present in the specific cell 211B.

The SGSN 230 is an apparatus (Serving GPRS Support Node) configured to perform packet switching in a packet switching domain. The SGSN 230 is provided in the core network 50. Although not shown in FIG. 1, an apparatus (MSC; Mobile Switching Center) configured to perform circuit switching in a circuit switching domain may be provided in the core network 50.

In addition, the general cell and the specific cell must be understood as functions of performing radio communication with the UE 10. However, the general cell and the specific cell are also used as terms indicating coverage areas of cells. Further, cells such as the general cell and the specific cell are identified according to such as frequency, spreading code or time slot used in the cells.

Here, a coverage area of the general cell is larger than a coverage area of the specific cell. The general cell is, for example, a macro cell provided by a communication provider. The specific cell is, for example, a femto cell or a home cell provided by a third party other than the communication provider. However, the specific cell may be a CSG (Closed Subscriber Group) cell or a pico cell provided by the communication provider.

Further, in the followings, the first communication system will be mainly described. However, the following description may also be applied to the second communication system.

Here, in the first communication system, an OFDMA (Orthogonal Frequency Division Multiple Access) scheme is used as a downlink multiplexing scheme, and an SC-FDMA (Single-Carrier Frequency Division Multiple Access) scheme is used as an uplink multiplexing scheme.

Furthermore, in the first communication system, an uplink control channel (PUCCH; Physical Uplink Control Channel), an uplink shared channel (PUSCH; Physical Uplink Shared Channel) and the like exist as an uplink channel. Further, a downlink control channel (PDCCH; Physical Downlink Control Channel), a downlink shared channel (PDSCH; Physical Downlink Share Channel), and the like exist as a downlink channel.

The uplink control channel is a channel configured to transfer a control signal. The control signal is, for example, CQI (Channel Quality Indicator), PMI (Precoding Matrix Indicator), RI (Rank Indicator), SR (Scheduling Request) and ACK/NACK.

The CQI is a signal for notifying a recommended modulation method and encoding rate to be used in downlink transmission. The PMI is a signal indicating a precoder matrix that is preferably used in downlink transmission. The RI is a signal indicating number of layers (number of streams) to be used in downlink transmission. The SR is a signal for requesting an assignment of an uplink radio resource (a resource block which will be described later). The ACK/NACK is a signal indicating whether a signal transmitted through a downlink channel (for example, the PDSCH) has been received or not.

The uplink shared channel is a channel configured to transfer a control signal (including the control signal described above) and/or a data signal. For example, the uplink radio resource may be assigned only to the data signal, or assigned such that the data signal and the control signal are multiplexed.

The downlink control channel is a channel configured to transfer a control signal. The control signal is, for example, Uplink SI (Scheduling Information), Downlink SI (Scheduling Information), and TPC bit.

The Uplink SI is a signal indicating an assignment of the uplink radio resource. The Downlink SI is a signal indicating an assignment of the downlink radio resource. The TPC bit is a signal for instructing to increase or decrease power of a signal transmitted through the uplink channel.

The downlink shared channel is a channel configured to transfer a control signal and/or a data signal. For example, the downlink radio resource may be assigned only to the data signal, or assigned such that the data signal and the control signal are multiplexed.

In addition, a TA (Timing Advance) is exemplified as a control signal transmitted through the downlink shared channel. The TA is transmission timing correction information between the UE 10 and the MeNB 110A and is measured by the MeNB 110A based on an uplink signal transmitted from the UE 10.

Furthermore, a ACK/NACK is exemplified as a control signal transmitted through a channel other than the downlink control channel (the PDSCH) and the downlink shared channel (the PDSCH). The ACK/NACK is a signal indicating whether a signal transmitted through an uplink channel (for example, the PDSCH) has been received.

In addition, the general cell and the specific cell broadcast broadcast information through a broadcast channel (BCCH; Broadcast Control Channel). The broadcast information is, for example, MIB (Master Information Block) or SIB (System Information Block).

(Radio Frame)

Figure 2:
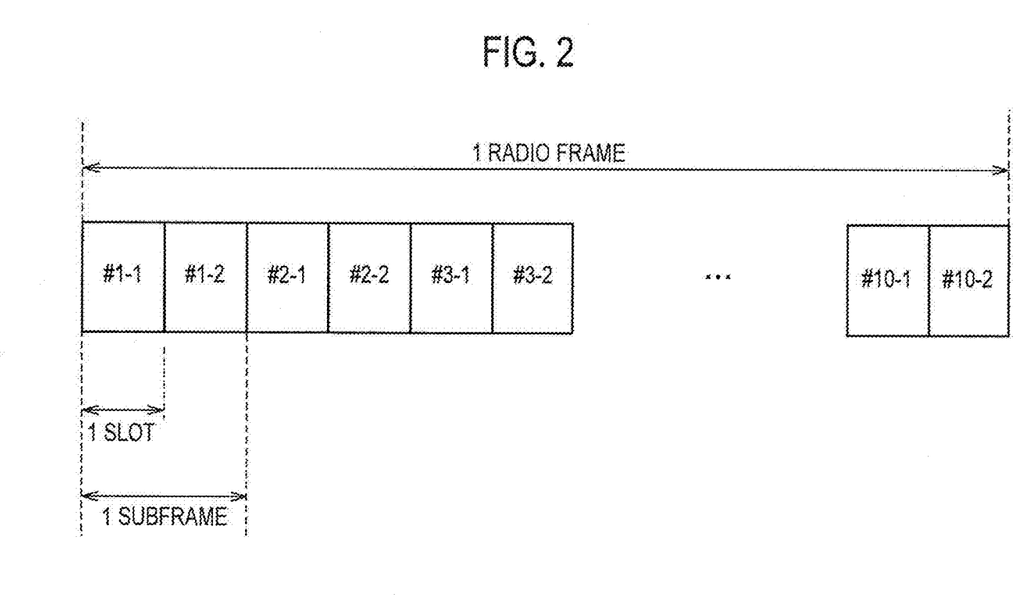
FIG. 2 is a diagram of a radio frame according to the first embodiment.

Hereinafter, a radio frame in the first communication system will be described. FIG. 2 is a diagram of the radio frame in the first communication system.

As shown in FIG. 2, one radio frame is configured by 10 subframes and one subframe is configured by two slots. One slot has a time length of 0.5 msec, one subframe has a time length of 1 msec, and one radio frame has a time length of 10 msec.

In addition, one slot is configured by a plurality of OFDM symbols (for example, six OFDM symbols or seven OFDM symbols) in a downward direction. Similarly, one slot is configured by a plurality of SC-FDMA symbols (for example, six SC-FDMA symbols or seven SC-FDMA symbols) in an upward direction.

(Radio Resource)

Figure 3:
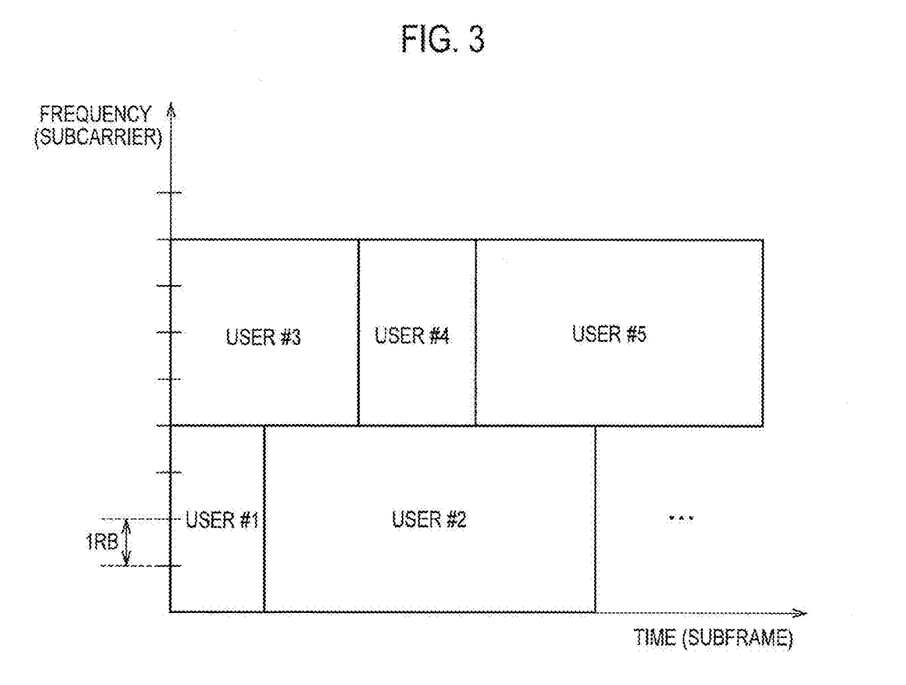
FIG. 3 is a diagram of a radio resource according to the first embodiment.

Hereinafter, a radio resource in the first communication system will be described. FIG. 3 is a diagram of the radio resource in the first communication system.

As shown in FIG. 3, a radio resource is defined by a frequency axis and a time axis. A frequency is configured by a plurality of subcarriers, and a predetermined number of subcarriers (12 subcarriers) are called a resource block (RB). A time has an unit, such as the OFDM symbol (or the SC-FDMA symbol), the slot, the subframe, and the radio frame, as described above.

Here, the radio resource is assignable to each of resource clock. Further, on the frequency axis and the time axis, it is possible to divide the radio resources to assign to a plurality of users (for example, user #1 to user #5).

Furthermore, the radio resource is assigned by the MeNB 110A. The MeNB 110A assigns the radio resource to each UE 10 based on the CQI, the PMI, the RI, and the like.

(Application Scene)

Figure 4:
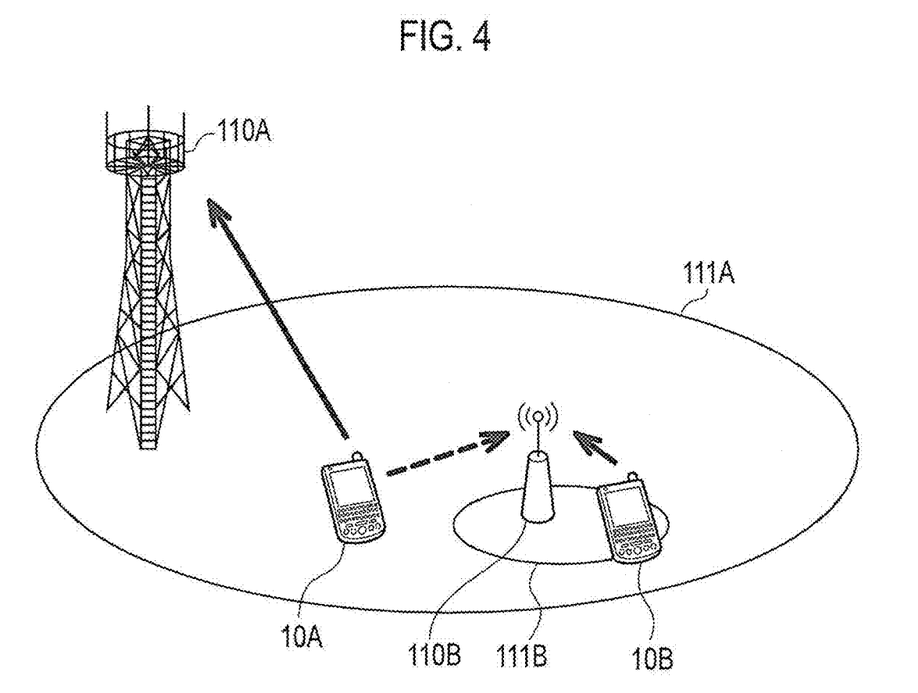
FIG. 4 is a diagram showing an application case according to the first embodiment.

Hereinafter, an application scene according to the first embodiment will be described. FIG. 4 is a diagram for explaining the application scene according to the first embodiment. Here, the MeNB 110A is exemplified as the general base station that manages the general cell and the HeNB 110B is exemplified as the specific base station that manages the specific cell.

Furthermore, a MUE 10A is exemplified as the UE 10 (hereinafter, MUE) in a connected state in the general cell 111A. A HUE 10B is exemplified as the UE 10 (hereinafter, HUE) in a connected state in the specific cell 111B.

As shown in FIG. 4, an uplink signal transmitted from the MUE 10A to the MeNB 110A interferes with an uplink signal transmitted from the HUE 10B to the MeNB 110A according to the position of the MUE 10A.

Because the MUE 10A is in a connected state in the general cell 111A, the HeNB 110B is not able to identify the MUE 10A that gives interference to the specific cell 111B. Further, because the MUE 10A that gives interference to the specific cell 111B is not able to receive a downlink signal from the specific cell 111B, the MUE 10A does not understand the MUE 10A itself gives interference to an uplink signal of the specific cell 111B. Therefore, in the conventional procedure, the MeNB 110A is not able to identify the MUE 10A that gives interference to the specific cell 111B.

However, in the conventional procedure, the HeNB 110B is able to transmit, to the MeNB 110A, an interference report (OI: Overload Indicator) showing that the interference occurs in the specific cell 111B. For example, the interference report shows whether interference occurs in each resource block. Alternatively, the interference report shows levels of interference occurring in each resource block.

On the other hand, in the first embodiment, an RACH signal for interference detection is transmitted from the MUE to the HeNB 110B, and a detection result of the RACH signal for interference detection is notified by the HeNB 110B to the MeNB 110A.

Here, synchronization between a timing of a subframe in the general cell 111A and a timing of a subframe in the specific cell 111B is not always made. Accordingly, a case is considered that an RACH signal for interference detection is not transmitted and the HeNB 110B is not able to detect the RACH signal for interference detection during the RACH detection period of the HeNB 110B.

Accordingly, to enable the HeNB 110B to detect the RACH signal for interference detection, a transmission timing of the RACH signal for interference detection is designated by the MeNB 110A.

Figure 5:
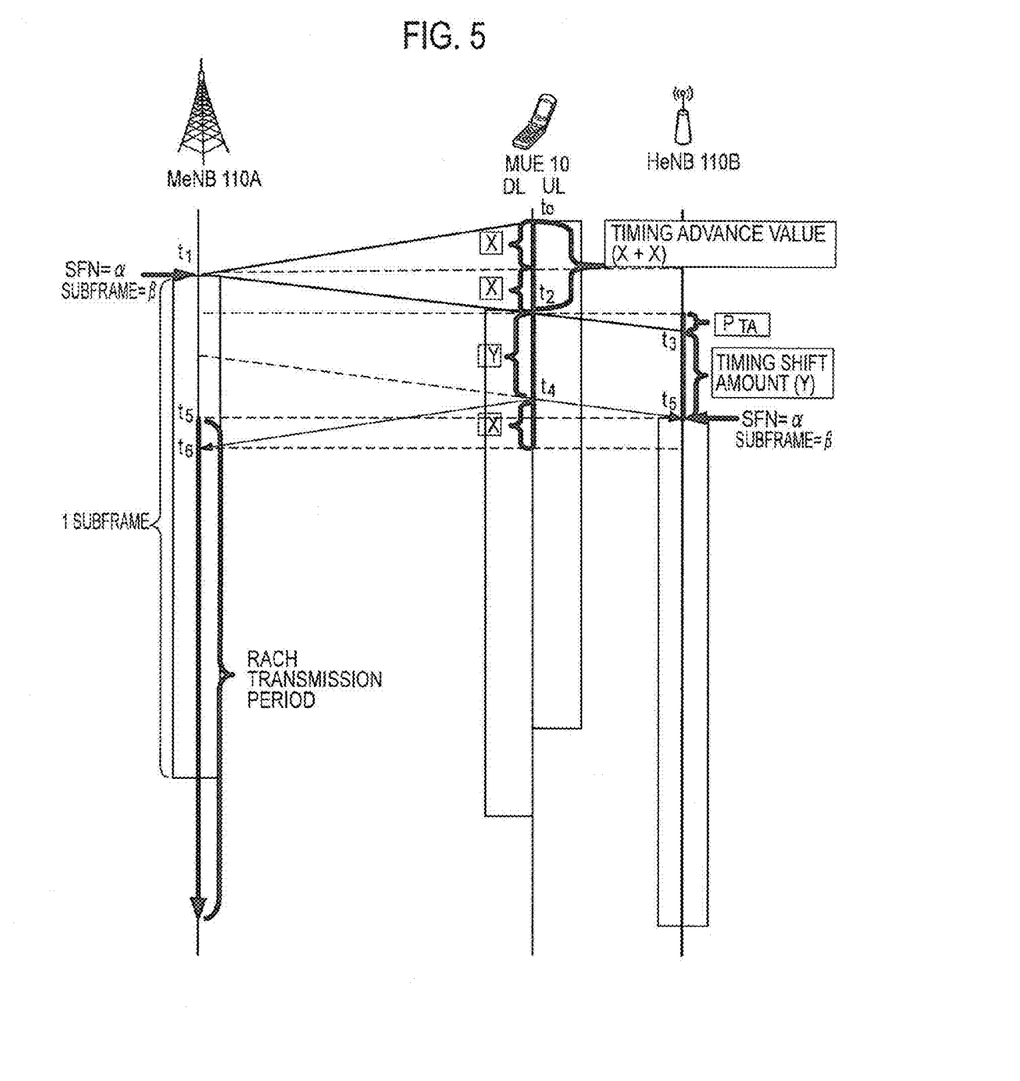
FIG. 5 is a diagram showing a transmission timing of an RACH signal for interference detection according to the first embodiment.

Specifically, as shown in FIG. 5, a timing, at which the MUE transmits an uplink signal to the MeNB 110A, is a time $t_0$. A timing, at which the MeNB 110A receives the uplink signal from MUE, is a time $t_1$. A timing, at which the MUE receives a downlink signal from the MeNB 110A, is time $t_2$. Here, the difference between the time $t_0$ and the time $t_1$ and the difference between the time $t_1$ and the time $t_2$ indicate a propagation delay time between the MUE and MeNB 110A. The difference between the time $t_0$ and the time $t_2$ indicates an adjustment amount between a transmission timing of an uplink signal and a transmission timing of a downlink signal in the general cell 111A, and is called TA (Timing Advance).

As shown in FIG. 5, in the MeNB 110A, a timing, at which a SFN (System Frame Number) is α and a subframe number is β, is the time $t_1$. On the other hand, in the HeNB 110B, a timing, at which the SFN (System Frame Number) is α and the subframe number is β, is a time $t_5$.

In such a case, the downlink signal transmitted from the MeNB 110A at the time $t_1$ is received by the HeNB 110B at a time $t_3$. Accordingly, a timing shift amount between the general cell 111A and the specific cell 111B is expressed by the difference (a timing shift amount Y) between the time $t_5$ and the time $t_3$.

Accordingly, the HeNB 110B is able to receive a downlink signal including a known preamble and detect the timing shift amount Y. The known preamble is information capable of designating the SFN and the subframe number of the MeNB 110A.

Furthermore, a case is considered that a subframe β is an RACH detection period of the HeNB 110B. In such a case, the MUE transmits the RACH signal for interference detection at a time $t_4$, so that the HeNB 110B is able to receive the RACH signal for interference detection at the time $t_5$ and detect the RACH signal for interference detection.

For example, in the case that the MUE transmits the RACH signal for interference detection in accordance with the downlink signal transmitted from the MeNB 110A at the time $t_1$, the transmission timing of the RACH signal for interference detection is a time (the time $t_4$ shown in FIG. 5) after the timing shift amount Y from a reception time (the time $t_2$ shown in FIG. 5) of a downlink signal instructing the transmission of the RACH signal for interference detection.

Alternatively, the transmission timing of the RACH signal for interference detection is a time (the time $t_4$ shown in FIG. 5) after the TA and the timing shift amount Y from a time (the time $t_2$ shown in FIG. 5) at which the MUE should transmit RACH to the general cell 111A.

As described above, the transmission timing of the RACH signal for interference detection is determined based on the timing shift amount between the general cell 111A and the specific cell 111B.

As described above, when the RACH signal for interference detection is transmitted from the MUE, the RACH signal for interference detection transmitted from the MUE reaches the MeNB 110A at a time $t_6$. Accordingly, an uplink signal transmitted from another MUE that does not transmit an RACH signal for interference detection is interfered by the RACH signal for interference detection.

Thereby, in the first embodiment, it is preferable that the MeNB 110A does not assign an uplink radio resource in the general cell 111A and restricts scheduling of the uplink radio resource during an RACH transmission period in which the RACH signal for interference detection is transmitted. As shown in FIG. 5, the RACH transmission period is, for example, one subframe period from the time $t_5$.

In other words, when transmitting a downlink signal instructing the transmission of the RACH signal for interference detection at the time $t_1$, it is preferable that the MeNB 110A does not assign the uplink radio resource in the general cell 111A over one subframe period after a time (the time $t_5$ shown in FIG. 5), at which X+Y+$P_{TA}$ passed, from the time $t_1$. In addition, the $P_{TA}$ indicates a TA value at which a HUE located at a cell edge of the HeNB 110B is expected to be considered by the HeNB 110B. The $P_{TA}$ may be a fixed value and the HeNB 110B knows the $P_{TA}$ in advance.

Alternatively, the MeNB 110A may not assign the uplink radio resource in the general cell 111A over one subframe period after a time (the time $t_5$ shown in FIG. 5), at which 2X+Y passed, from the time $t_1$.

(General Base Station)

Figure 6:
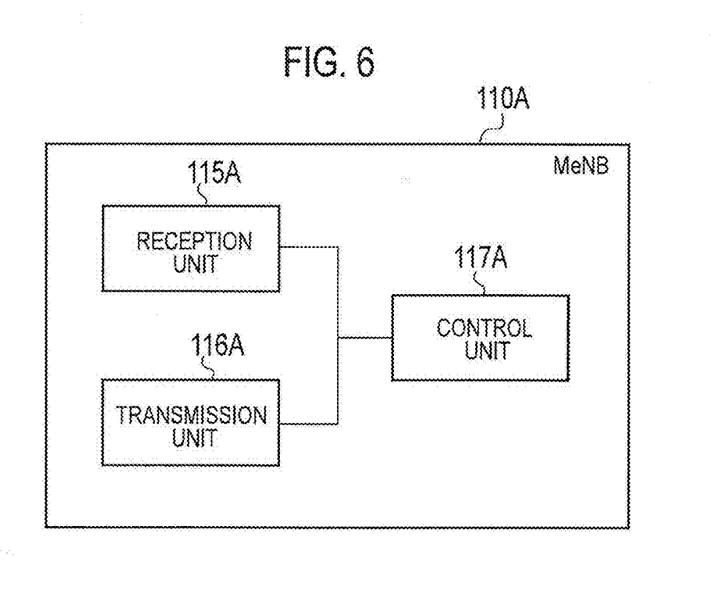
FIG. 6 is a block diagram of MeNB 110A according to the first embodiment.

Hereinafter, the general base station according to the first embodiment will be described. FIG. 6 is a block diagram showing the general base station (here, the MeNB 110A) according to the first embodiment.

As shown FIG. 6, the MeNB 110A comprises a reception unit 115A, a transmission unit 116A, and a control unit 117A.

The reception unit 115A receives an uplink signal from the UE 10 (for example, the MUE). The reception unit 115A receives a message (for example, the interference report, the timing shift amount, the RACH parameter candidates, or the detection result of the RACH signal for interference detection) from the HeNB 110B through a back haul network. The interference report indicates that interference occurs in the specific cell 111B as described above. The RACH parameter candidates are candidates for selecting an RACH parameter. For example, the RACH parameter candidates are candidates of a random access preamble for generating the RACH signal for interference detection. The detection result of the RACH signal for interference detection includes an RACH parameter (a random access preamble and a PRACH mask index) designated by the MeNB 110A.

The transmission unit 116A transmits a downlink signal (for example, an RACH parameter and a transmission timing of the RACH signal for interference detection) to the UE 10 (for example, MUE). The transmission unit 116A transmits a message to the HeNB 110B through the back haul network. The RACH parameter is a parameter used in the transmission of the RACH signal for interference detection. The RACH parameter includes, for example, the random access preamble and the PRACH mask index.

The control unit 117A controls the operation of the MeNB 110A. For example, the control unit 117A assigns a radio resource to the MUE. The control unit 117A identifies MUE (hereinafter, interfering MUE) that gives interference to the specific cell 111B based on the detection result (the random access preamble, the PRACH mask index) of the RACH signal for interference detection. The control unit 117A instructs the identified interfering MUE to perform handover to a frequency that is different from a frequency used in the specific cell 111B. Specifically, the control unit 117A controls the operation of the MeNB 110A shown in FIG. 8.

(Specific Base Station)

Figure 7:
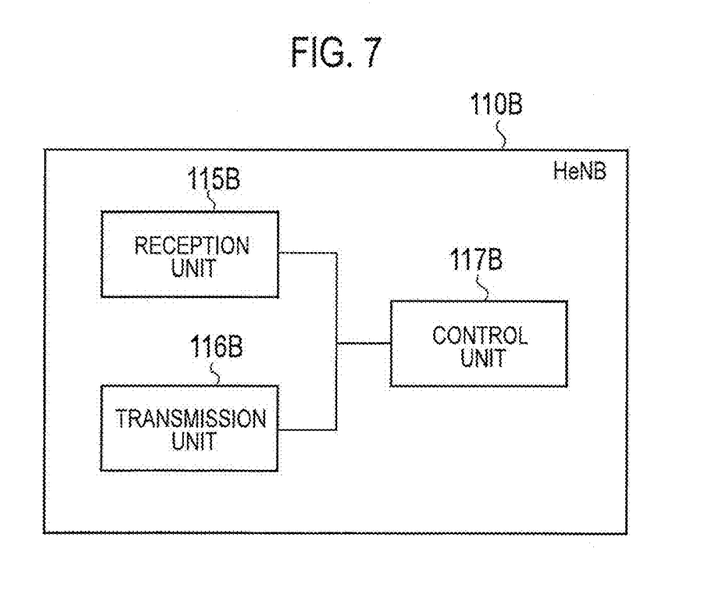
FIG. 7 is a block diagram of HeNB 110B according to the first embodiment.

Hereinafter, the specific base station according to the first embodiment will be described. FIG. 7 is a block diagram shown the specific base station (here, the HeNB 110B) according to the first embodiment.

As shown in FIG. 7, the HeNB 110B comprises a reception unit 115B, a transmission unit 116B, and a control unit 117B.

The reception unit 115B receives an uplink signal (for example, the RACH signal for interference detection) from the UE 10 (for example, the HUE). The reception unit 115B receives a message from the MeNB 110A through the back haul network.

The transmission unit 116B transmits a downlink signal to the UE 10 (for example, the HUE). The transmission unit 116B transmits the message (for example, the interference report, the timing shift amount, the RACH parameter candidates, or the detection result of the RACH signal for interference detection) to the MeNB 11A through the back haul network.

The control unit 117B controls the HeNB 110B. For example, the control unit 117B assigns a radio resource to the HUE. Specifically, the control unit 117B controls the operation of the HeNB 110B shown in FIG. 8.

(Operation of Mobile Communication System)

Figure 8:
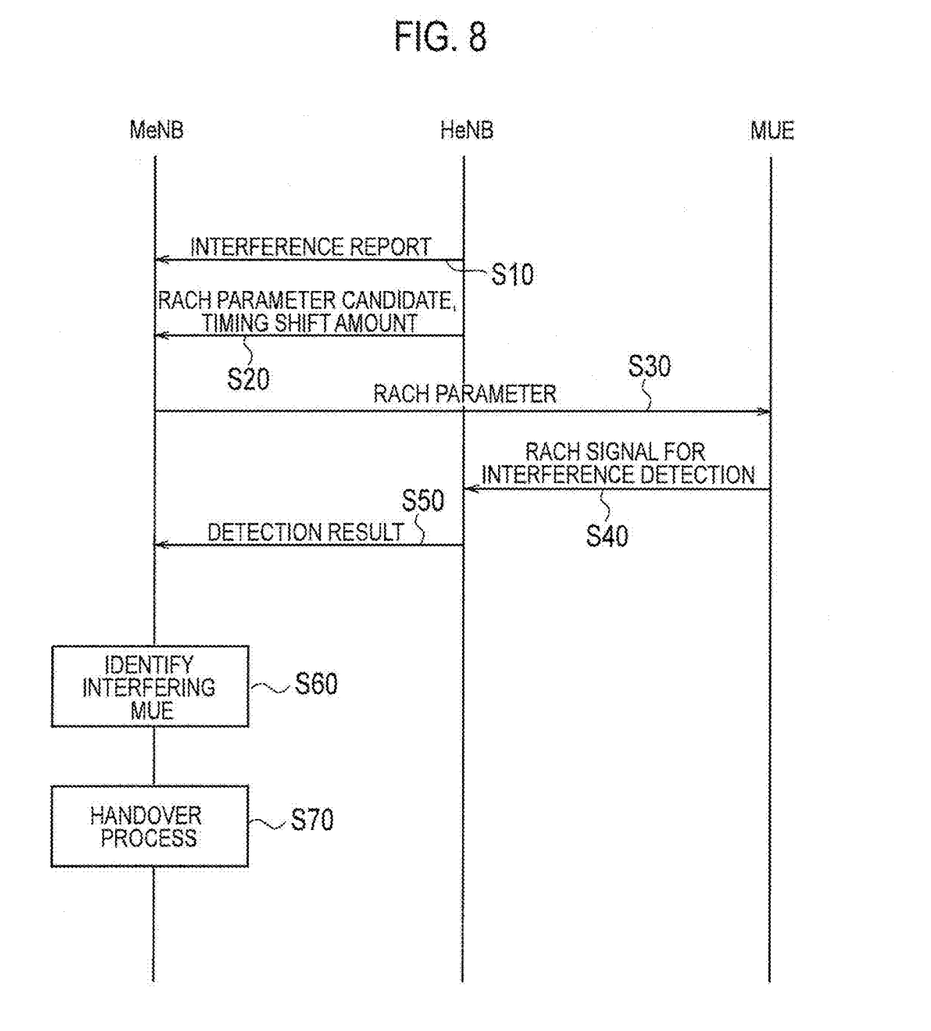
FIG. 8 is a sequence diagram showing an operation of the mobile communication system 100 according to the first embodiment.

Hereinafter, the operation of the mobile communication system according to the first embodiment will be described. FIG. 8 is a sequence diagram showing an operation of the mobile communication system 100 according to the first embodiment.

As shown in FIG. 8, in step 10, the HeNB 110B transmits (notifies), to the MeNB 110A, an interference report indicating that interference occurs in the specific cell 111B.

In step 20, the HeNB 110B transmits (notifies), to the MeNB 110A, RACH configuration information (RACH Config Information) of the HeNB 110B and a timing shift amount. The RACH configuration information defines RACH, and defines rootSequenceIndex used in the RACH, timings at which the RACH can be transmitted, an available range of a random access preamble, and the like. That is, RACH configuration information is an example of the RACH parameter candidate.

In step 30, the MeNB 110A transmits, to the MUE, the RACH parameter (for example, the random access preamble and the PRACH mask index). Here, the MeNB 110A acquires the timings, at which the RACH can be transmitted, based on the RACH configuration information, and designates the transmission timing of the RACH signal for interference detection among the acquired timings by the PRACH mask index. The RACH signal for interference detection encodes a portion instructed by the random access preamble, based on a cyclic code of the rootSequenceIndex.

Here, it is noted that a downlink signal including the RACH parameter and the transmission timing of the RACH signal for interference detection is a downlink signal instructing the transmission of the RACH signal for interference detection.

In step 40, the MUE transmits the RACH signal for interference detection using the RACH parameter received from the MeNB 110A at the transmission timing receiving from the MeNB 110A.

In step 50, the HeNB 110B transmits (notifies) the detection result (for example, the random access preamble and the PRACH mask index) of the RACH signal for interference detection.

Here, when a reception level of the RACH signal for interference detection is equal to or more than a predetermined threshold value, the HeNB 110B may transmit the detection result of the RACH signal for interference detection.

In step 60, the MeNB 110A identifies MUE (hereinafter, interfering MUE) that gives interference to the specific cell 111B based on the detection result of the RACH signal for interference detection (the random access preamble and the PRACH mask index).

In step 70, the MeNB 110A instructs the identified interfering MUE to perform handover to a frequency that is different from a frequency used in the specific cell 111B.

(Operation and Effect)

In the first embodiment, the RACH signal for interference detection is transmitted from the MUE to the HeNB 110B and the detection result of the RACH signal for interference detection is notified by the HeNB 110B to the MeNB 110A. Consequently, the MeNB 110A is able to identify an interference source (MUE) of interference that is given to the specific cell 111B, according to the detection result of the RACH signal for interference detection.

In the first embodiment, the transmission timing of the RACH signal for interference detection is transmitted from the MeNB 110A to the MUE. The transmission timing of the RACH signal for interference detection is determined based on the timing shift amount between the general cell 111A and the specific cell 111B. Consequently, even when synchronization between a timing of a subframe in the general cell 111A and a timing of a subframe in the specific cell 111B is not made, the HeNB 110B is able to detect the RACH signal for interference detection transmitted from the MUE.

First Modification

As followings, a first modification of the first embodiment will be described. The differences from the first embodiment will be described mainly as below.

In the first modification, the MeNB 110A transmits a downlink signal instructing the transmission of the RACH signal for interference detection to MUE that is located on a belt-like annular area indicating the range from a distance $L_{MIN}$ to a distance L. In other words, the MeNB 110A transmits the downlink signal including the RACH parameter and the transmission timing of the RACH signal for interference detection to the MUE that is located in the belt-like annular area indicating the range from the distance $L_{MIN}$ to the distance L.

Here, the distance $L_{MIN}$ indicates a distance between an edge closet to the MeNB 110A among the edges of the coverage area of the specific cell 111B and the MeNB 110A. The distance L indicates a distance between an edge most distant from the MeNB 110A among the edges of the coverage area of the specific cell 111B and the MeNB 110A.

Figure 9:
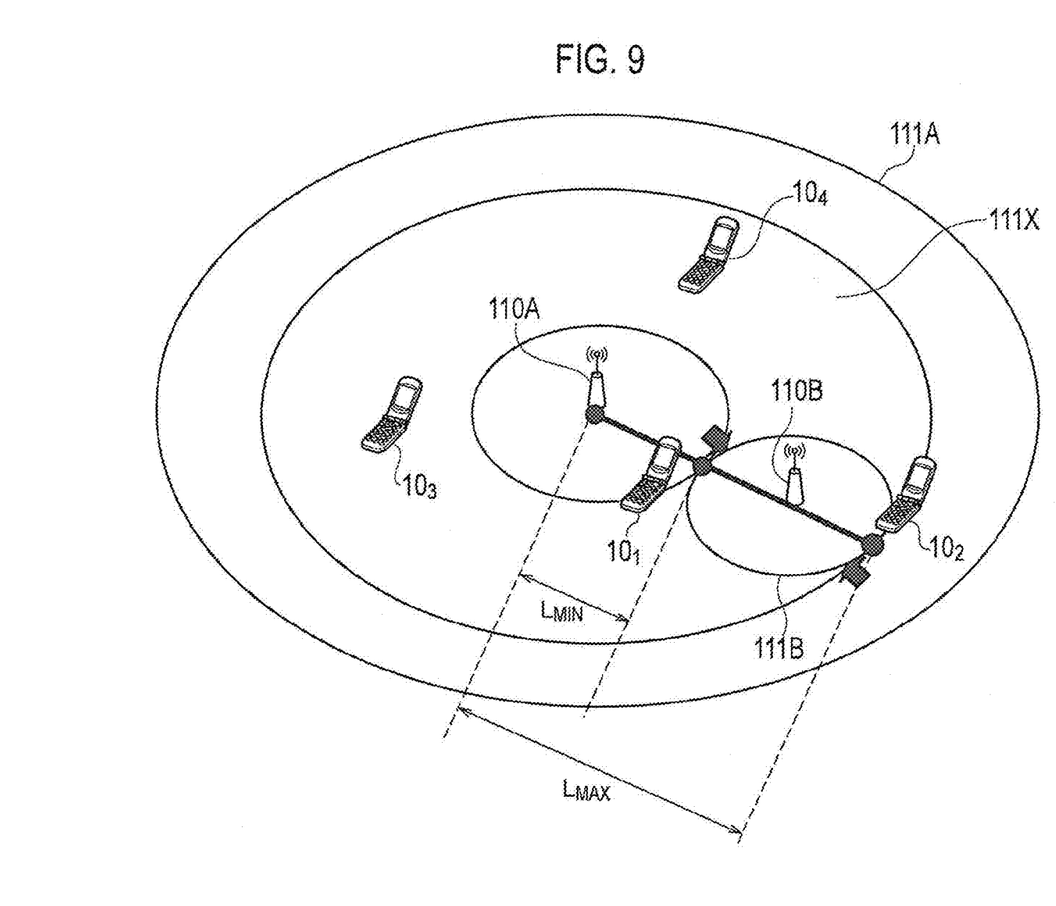
FIG. 9 is a diagram showing a belt-like annular area 111X according to a first modification.

For example, as shown in FIG. 9, a belt-like annular area 111X is determined based on synchronization timing correction value of an uplink signal set from the general cell 111A immediately before handover of UE 10 (UE $10_1$ and UE $10_2$) that is handed over from the general cell 111A to the specific cell B. That is, the belt-like annular area 111X is determined based on TA (Timing Advance) set from the general cell 111A immediately before the handover of the UE 10 that is handed over from the general cell 111A to the specific cell 111B. Specifically, the belt-like annular area 111X is an area that the TA belongs to in the range from a minimum value −α of the TA to a maximum value +α of the TA. However, α is a predetermined value.

In this case, the MeNB 110A transmits a handover instruction that instructs handover to a frequency different from a frequency used in the specific cell 111B to UE $10_1$ to UE $10_4$ located in the belt-like annular area 111X.

Figure 10:
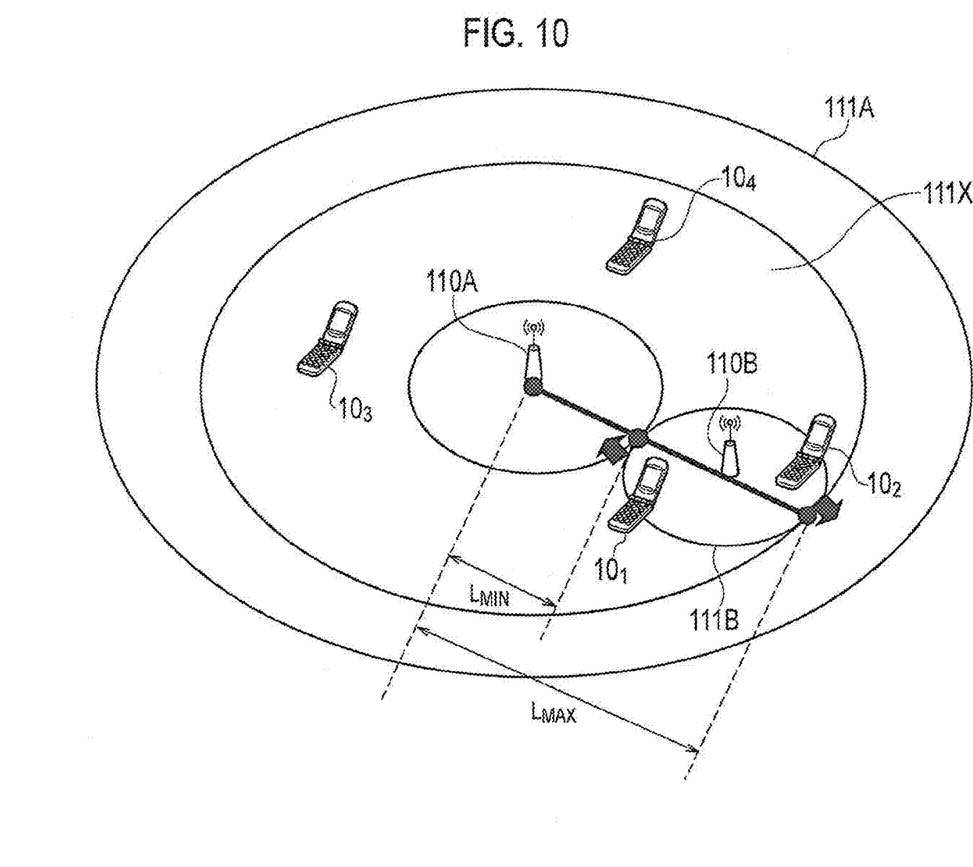
FIG. 10 is a diagram showing the belt-like annular area 111X according to the first modification.

Alternatively, as shown in FIG. 10, the belt-like annular area 111X is determined based on a synchronization timing correction value of an uplink signal of the UE 10 (UE $10_1$ and UE $10_2$) that is handed over from the specific cell 111B to the general cell 111A. Specifically, the belt-like annular area 111X is an area that the synchronization timing correction value belongs to in the range from a minimum value $-\alpha$ of the synchronization timing correction value to a maximum value $+\alpha$ of the synchronization timing correction value. However, $\alpha$ is a predetermined value.

Alternatively, the belt-like area 111X is determined based on a synchronization timing correction value of an uplink signal set from the general cell 111A immediately after the handover of the UE 10 (UE $10_1$ and UE $10_2$) that is handed over from the specific cell 111B to the general cell 111A. That is, the belt-like annular area 111X is determined based on a minimum value and a maximum value of TA (Timing Advance) set from the general cell 111A immediately after the handover of the UE 10 that is handed over from the specific cell 111B to the general cell 111A.

In this case, the MeNB 110A transmits a handover instruction that instructs the handover to a frequency different from a frequency used in the specific cell 111B, to UE $10_1$ to UE $10_4$ located in the belt-like annular area 111X.

Second Modification

As followings, a second modification of the first embodiment will be described. The differences from the first embodiment will be described mainly as below.

In the second modification, a random access preamble for generating the RACH signal for interference detection is different from a random access preamble for generating the PRACH used in the specific cell 111B.

Here, in the 3GPP standards, a random access preamble is classified into a plurality of groups. The HeNB 110B selects a group different from a group that the random access preamble used in the specific cell 111B belongs to, as the RACH parameter candidate. Alternatively, the HeNB 110B may assign a random access preamble in a predetermined period of available random access preambles to the RACH signal for interference detection, and prohibit the use of a random access preamble within another period other than the predetermined period.

Other Embodiments

The present invention is explained as the embodiments described above, but it must not be understood that the discussions and the drawings constituting a part of these disclosures limit the present invention. Various modifications, embodiments, and operation techniques will be apparent to those of ordinary skill in the art in viewing of these disclosures.

In the embodiments, the MeNB 110A was exemplified as the general base station that manages the general cell and the HeNB 110B was exemplified as the specific base station that manages the specific cell. However, the general base station that manages the general cell may be the MNB 210A. Further, the specific base station that manages the specific cell may be HNB 210B.

Note that the entire content of the U.S. Provisional Application No. 61/555,186 (filed on Nov. 3, 2011) is incorporated herein by reference.

INDUSTRIAL APPLICABILITY

According to the present invention, a general mobile terminal that gives interference to a specific cell can be identified.

The invention claimed is:

1. A mobile communication method which is applied to a mobile communication system comprising a general base station that manages a general cell and a specific base station that manages a specific cell having a coverage area smaller than a coverage area of the general cell, the mobile communication method comprising:
    a step A of transmitting, from a general mobile terminal to the specific base station, an RACH signal for interference detection, the general mobile terminal being a mobile terminal in a connected state in the general cell; and
    a step B of notifying, by the specific base station, the general base station of a detection result of the RACH signal for interference detection, wherein
    the transmission timing of the RACH signal for interference detection is determined based on a timing shift amount between the general cell and the specific cell.

2. The mobile communication method according to claim 1 comprising:
    a step C of transmitting, from the general base station to the general mobile terminal, an RACH parameter used in transmission of the RACH signal for interference detection and a transmission timing of the RACH signal for interference detection, wherein
        the transmission timing of the RACH signal for interference detection is determined based on a timing shift amount between the general cell and the specific cell.

3. The mobile communication method according to claim 1 comprising:
    a step D of notifying, by the specific base station, the general base station of an RACH parameter candidate for selecting the RACH parameter.

4. The mobile communication method according to claim 3, wherein,
    in the step D, when interference occurs in the specific cell, the RACH parameter candidates are notified by the specific base station to the general base station.

5. The mobile communication method according to claim 1 comprising:
    a step E of restricting, by the general base station, scheduling of an uplink radio resource without assigning the uplink radio resource in the general cell within an RACH transmission period in which the RACH signal for interference detection is transmitted.

6. The mobile communication method according to claim 1, wherein
    a distance between an edge closest to the general base station among edges of a coverage area of the specific cell and the general base station is a distance $L_{MIN}$,
    a distance between an edge most distant from the general base station among the edges of the coverage area of the specific cell and the general base station is a distance $L_{MAX}$, and
    in the step C, the RACH parameter and the transmission timing of the RACH signal for interference detection are transmitted from the general base station to the general mobile terminal located in a belt-like annular area indicating a range from the distance $L_{MIN}$ to the distance $L_{MAX}$.

7. The mobile communication method according to claim 6, wherein
    the belt-like annular area is determined based on a difference between a synchronization timing of a downlink of the mobile terminal that is handed over from the general cell to the specific cell and a synchronization timing of an uplink signal of the mobile terminal that is handed over from the general cell to the specific cell.

8. The mobile communication method according to claim 6, wherein
the belt-like annular area is determined based on a synchronization timing correction value of the uplink signal of the mobile terminal that is handed over from the specific cell to the general cell.

9. A general base station in a mobile communication system comprising the general base station that manages a general cell and a specific base station that manages a specific cell having a coverage area smaller than a coverage area of the general cell, the general base station comprising:
a transmitting unit configured to transmit a downlink signal to a general mobile terminal; and
a receiving unit configured to receive a detection result of an RACH signal for interference detection transmitted from the general mobile terminal to the specific base station, from the specific base station, the general mobile terminal being a mobile terminal in a connected state in the general cell, wherein
the transmission timing of the RACH signal for interference detection transmitted from the general mobile terminal to the specific base station is determined based on a timing shift amount between the general cell and the specific cell.

10. A specific base station in a mobile communication system comprising a general base station that manages a general cell and the specific base station that manages a specific cell having a coverage area smaller than a coverage area of the general cell, the specific base station comprising:
a receiving unit configured to receive a RACH signal for interference detection from a general mobile terminal; and
a transmitting unit configured to transmit a detection result of the RACH signal for interference detection received from the general mobile terminal, to the general base station, the general mobile terminal being a mobile terminal in a connected state in the general cell, wherein
the transmission timing of the RACH signal for interference detection received from the general mobile terminal is determined based on a timing shift amount between the general cell and the specific cell.

* * * * *